(12) United States Patent
Kim et al.

(10) Patent No.: US 11,197,282 B2
(45) Date of Patent: Dec. 7, 2021

(54) METHOD AND APPARATUS FOR SIDELINK COMMUNICATIONS IN COMMUNICATION SYSTEM

(71) Applicant: Electronics and Telecommunications Research Institute, Daejeon (KR)

(72) Inventors: Jun Hyeong Kim, Daejeon (KR); Il Gyu Kim, Chungcheongbuk-Do (KR); Go San Noh, Daejeon (KR); Ju Ho Park, Daejeon (KR); Jung Hoon Lee, Daejeon (KR); Jun Hwan Lee, Seoul (KR); Hee Sang Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 63 days.

(21) Appl. No.: 16/538,915

(22) Filed: Aug. 13, 2019

(65) Prior Publication Data

US 2020/0053704 A1 Feb. 13, 2020

(30) Foreign Application Priority Data

Aug. 13, 2018 (KR) .................. 10-2018-0094602
Jul. 29, 2019 (KR) .................. 10-2019-0091832

(51) Int. Cl.
*H04W 72/04* (2009.01)
(52) U.S. Cl.
CPC .................. *H04W 72/042* (2013.01)
(58) Field of Classification Search
None
See application file for complete search history.

(56) References Cited

U.S. PATENT DOCUMENTS

| | | |
|---|---|---|
| 2017/0127405 A1 | 5/2017 | Agiwal et al. |
| 2017/0142766 A1 | 5/2017 | Kim |
| 2017/0188391 A1 | 6/2017 | Rajagopal et al. |
| 2018/0035416 A1 * | 2/2018 | Yi ............... H04W 72/0406 |
| 2018/0075746 A1 | 3/2018 | Jiang et al. |
| 2018/0123660 A1 | 5/2018 | Jung et al. |
| 2018/0263019 A1 | 9/2018 | Jung et al. |
| 2019/0132838 A1 * | 5/2019 | Yi ..................... H04L 5/0007 |
| 2019/0190643 A1 * | 6/2019 | Lee ................... H04L 1/0008 |
| 2019/0191461 A1 * | 6/2019 | Lee ...................... H04W 4/40 |
| 2019/0342047 A1 * | 11/2019 | Kim .................. H04L 5/0048 |
| 2020/0162212 A1 * | 5/2020 | Liu ............... H04W 72/0446 |

FOREIGN PATENT DOCUMENTS

| | | |
|---|---|---|
| KR | 1020180043315 A | 4/2018 |
| WO | 2016117940 A1 | 7/2016 |

* cited by examiner

*Primary Examiner* — Rebecca E Song
(74) *Attorney, Agent, or Firm* — Rabin & Berdo, P.C.

(57) ABSTRACT

A sidelink communication method performed by a UE in a communication system may comprise receiving, from a base station, a message including configuration information of a subchannel which is a sensing unit of a resource pool; determining a size of the subchannel based on the configuration information; and performing a sensing operation in units of the subchannel in the resource pool. Therefore, the sidelink communication can be efficiently performed, and the performance of the communication system can be improved.

20 Claims, 6 Drawing Sheets

METHOD AND APPARATUS FOR SIDELINK COMMUNICATIONS IN COMMUNICATION SYSTEM

CROSS-REFERENCE TO RELATED APPLICATIONS

This application claims priority to Korean Patent Applications No. 10-2018-0094602 filed on Aug. 13, 2018 and No. 10-2019-0091832 filed on Jul. 29, 2019 with the Korean Intellectual Property Office (KIPO), the entire contents of which are hereby incorporated by reference.

BACKGROUND

1. Technical Field

The present disclosure relates generally to sidelink communication technology, and more specifically, to sidelink communication technology supporting various numerologies.

2. Related Art

With the development of information and communication technology, various wireless communication technologies are being developed. Typical wireless communication technologies include long term evolution (LTE), new radio (NR), etc. defined in the 3rd generation partnership project (3GPP) standard. The LTE may be one of the fourth generation (4G) wireless communication technologies, and the NR may be one of the fifth generation (5G) wireless communication technologies.

The 5G communication system (e.g., communication system supporting the NR) using a frequency band (e.g., frequency band above 6 GHz) higher than a frequency band (e.g., frequency band below 6 GHz) of the 4G communication system as well as the frequency band of the 4G communication system is being considered for processing of wireless data which has rapidly increased since the commercialization of the 4G communication system. The 5G communication system can support Enhanced Mobile Broadband (eMBB), Ultra-Reliable and Low-Latency Communication (URLLC), and massive Machine Type Communication (mMTC).

Also, the 5G communication system may support sidelink communication. The 5G communication system supports a variety of numerologies, and resources (e.g., subchannels) for the sidelink communication may vary depending on the numerology. In this case, the sidelink communication may not be efficiently performed. Accordingly, common resources for the sidelink communication will be needed. In addition, the 5G communication system can support beamforming-based communication. When the sidelink communication is performed in a beamforming manner, beam management methods for this will be needed.

SUMMARY

Accordingly, embodiments of the present disclosure provide an apparatus and a method for sidelink communication in the 5G communication system.

According to embodiments of the present disclosure, a sidelink communication method performed by a user equipment (UE) in a communication system may comprise receiving, from a base station, a message including configuration information of a subchannel which is a sensing unit of a resource pool; determining a size of the subchannel based on the configuration information; and performing a sensing operation in units of the subchannel in the resource pool, wherein the size of the subchannel is configured to be identical regardless of a numerology $\mu$.

The configuration information may be received through at least one of system information, a radio resource control (RRC) message, a medium access control (MAC) control element (CE), and downlink control information (DCI).

The minimum number of resource blocks (RBs) constituting the subchannel may be determined by $K \times 2 \times 2^{-\mu}$ when the numerology $\mu$ is 0 or 1, and determined by $K \times 2 \times 2^{-(\mu-2)}$ when the numerology $\mu$ is 2 or 3, and K may be included in the configuration information of the subchannel.

The size of the subchannel through which a physical sidelink control channel (PSCCH) is transmitted may be determined by $n_1 \times$(the minimum number of RBs), and $n_1$ may be included in the configuration information of the subchannel.

The size of the subchannel through which a physical sidelink shared channel (PSSCH) is transmitted may be determined by $n_2 \times$(the minimum number of RBs), and $n_2$ may be included in the configuration information of the subchannel.

The message may further include information indicating a maximum number of usable beams.

The sidelink communication method may further comprise transmitting sidelink traffic using beam(s) equal to or less than the maximum number of usable beams in a candidate resource set(s) comprised of resources determined to be in an idle state by the sensing operation, and the sidelink traffic may include at least one of sidelink control information and sidelink data.

The sidelink traffic may be transmitted using a plurality of beams in a slot belonging to the candidate resource set(s).

The sidelink traffic may be transmitted using a different beam in each of a plurality of slots belonging to the candidate resource set(s).

The message may further include information indicating a structure of the resource pool, all resources belonging to the resource pool having a first structure may be used for transmission of a PSCCH or a PSSCH, resources used for transmission of the PSSCH may be configured to be adjacent to resources used for transmission of the PSCCH in the resource pool having a second structure, and resources used for transmission of the PSSCH may be configured to be non-adjacent to resources used for transmission of the PSCCH in the resource pool having a third structure.

Furthermore, according to embodiments of the present disclosure, an operation method of a base station supporting sidelink communication in a communication system may comprise generating a message including configuration information of a subchannel which is a sensing unit of a resource pool; and transmitting, to a UE, the message through at least one of system information, an RRC message, a MAC CE, and a DCI, wherein the size of the subchannel is configured to be identical regardless of a numerology $\mu$.

The message may further include information indicating a maximum number of usable beams and information indicating a structure of the resource pool, all resources belonging to the resource pool having a first structure may be used for transmission of a PSCCH or a PSSCH, resources used for transmission of the PSSCH may be configured to be adjacent to resources used for transmission of the PSCCH in the resource pool having a second structure, and resources used for transmission of the PSSCH may be configured to be non-adjacent to resources used for transmission of the PSCCH in the resource pool having a third structure.

The minimum number of RBs constituting the subchannel may be determined by $K \times 2 \times 2^{-\mu}$ when the numerology $\mu$ is 0 or 1, and determined by $K \times 2 \times 2^{-(\mu-2)}$ when the numerology $\mu$ is 2 or 3, and K may be included in the configuration information of the subchannel.

The size of the subchannel through which a PSCCH is transmitted may be determined by $n_1 \times$(the minimum number of RBs), and $n_1$ may be included in the configuration information of the subchannel.

The size of the subchannel through which a PSSCH is transmitted may be determined by $n_2 \times$(the minimum number of RBs), and $n_2$ may be included in the configuration information of the subchannel.

Furthermore, according to embodiments of the present disclosure, a UE performing sidelink communication in a communication system may comprise a processor, a transceiver transmitting and receiving signals according to control of the processor, and a memory storing at least one instruction executable by the processor. Also, the at least one instruction may be configured the processor to receive, from a base station, a message including configuration information of a subchannel which is a sensing unit of a resource pool; determine a size of the subchannel based on the configuration information; and perform a sensing operation in units of the subchannel in the resource pool, wherein the size of the subchannel is configured to be identical regardless of a numerology $\mu$.

The minimum number of RBs constituting the subchannel may be determined by $K \times 2 \times 2^{-\mu}$ when the numerology $\mu$ is 0 or 1, and determined by $K \times 2 \times 2^{-(\mu-2)}$ when the numerology $\mu$ is 2 or 3, and K may be included in the configuration information of the subchannel.

The message may further include information indicating a maximum number of usable beams.

The at least one instruction may be further configured the processor to transmit sidelink traffic using beam(s) equal to or less than the maximum number of usable beams in a candidate resource set(s) comprised of resources determined to be in an idle state by the sensing operation.

The message may further include information indicating a structure of the resource pool, all resources belonging to the resource pool having a first structure may be used for transmission of a PSCCH or a PSSCH, resources used for transmission of the PSSCH may be configured to be adjacent to resources used for transmission of the PSCCH in the resource pool having a second structure, and resources used for transmission of the PSSCH may be configured to be non-adjacent to resources used for transmission of the PSCCH in the resource pool having a third structure.

According to the embodiments of the present disclosure, the size of the subchannel can be configured to be identical regardless of the numerology. The UE may perform a sensing operation on a subchannel basis in a resource pool, and may transmit sidelink traffic by using one or more beams in a candidate resource set(s) determined to be in an idle state by the sensing operation. Further, the maximum number of usable beams for the sidelink communication may be preconfigured, and the sidelink traffic may be transmitted using beams equal to or less than the maximum number of usable beams. Therefore, the sidelink communication can be efficiently performed, and the performance of the communication system can be improved.

BRIEF DESCRIPTION OF DRAWINGS

Embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which embodiments of the present disclosure are applied will be described. The communication system to which the embodiments according to the present disclosure are applied is not limited to the following description, and the embodiments according to the present disclosure may be applied to various communication systems. Here, the communication system may be used in the same sense as a communication network.

Figure 1:
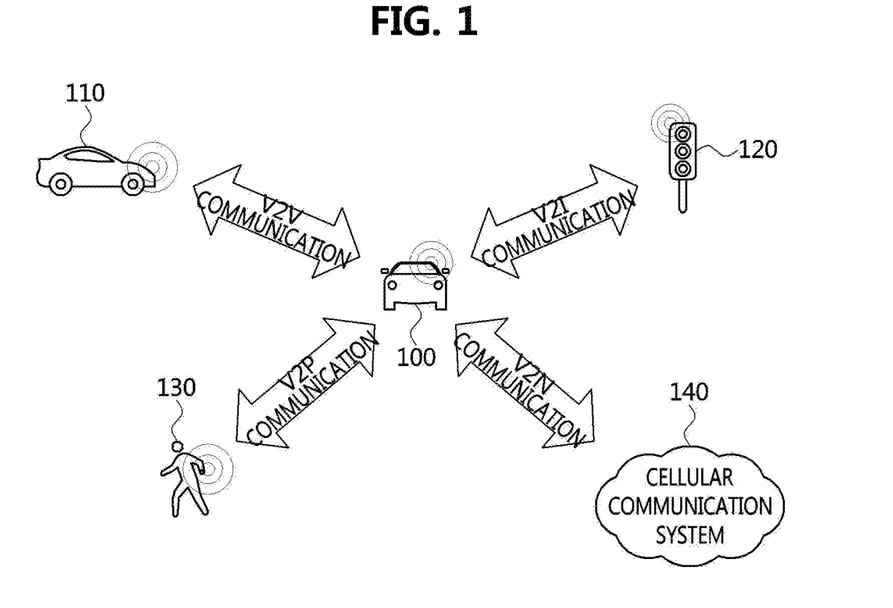
FIG. 1 is a conceptual diagram illustrating V2X communication scenarios.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communication may be performed in a beamforming manner. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a communication technology (e.g., IEEE 802.11p, IEEE 802.11bd, or the like) which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
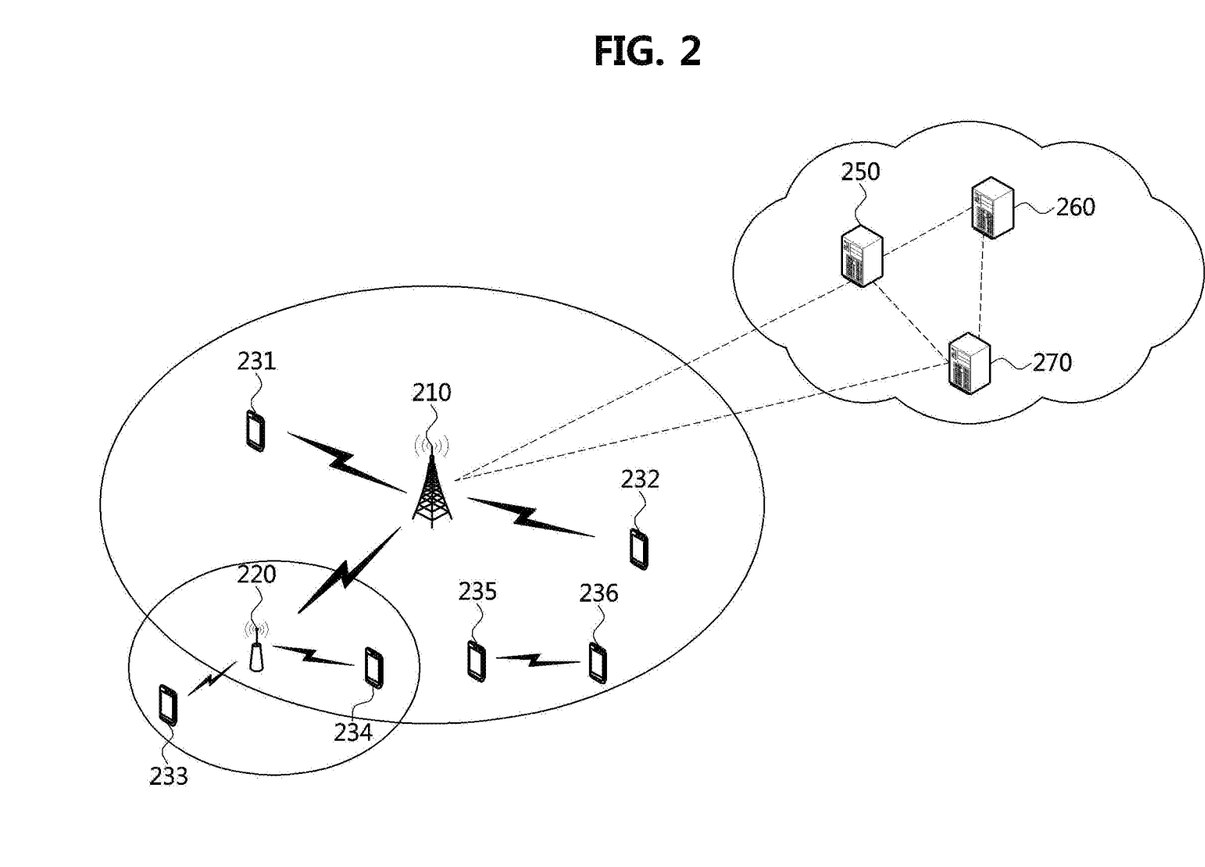
FIG. 2 is a conceptual diagram illustrating embodiments of a cellular communication system.

FIG. 2 is a conceptual diagram illustrating embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
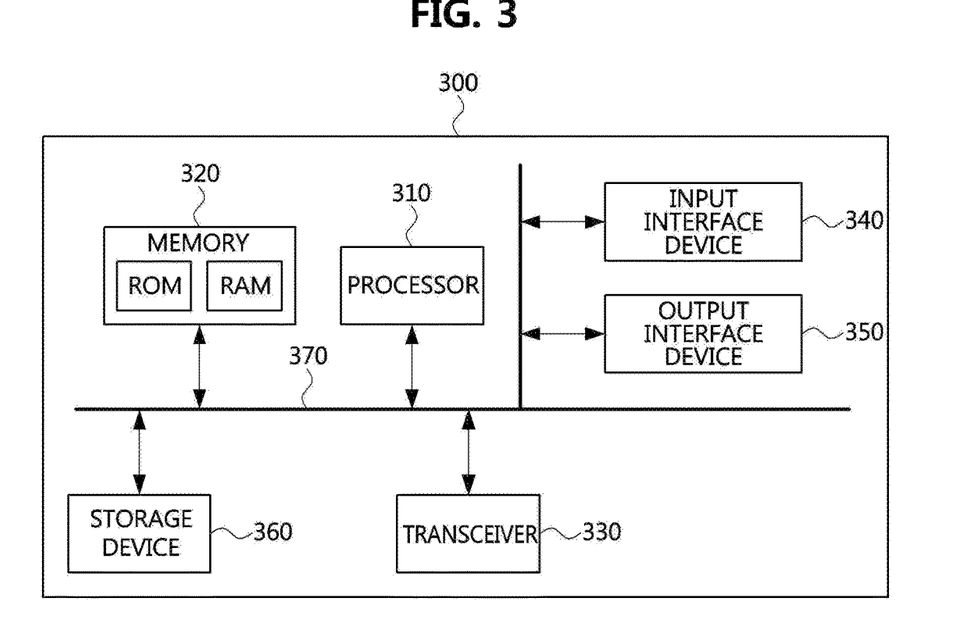
FIG. 3 is a conceptual diagram illustrating embodiments of a communication node constituting a cellular communication system.

FIG. 3 is a conceptual diagram illustrating embodiments of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), NR-U, etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, physical channels and physical signals used in the sidelink communication may be defined as shown in Table 2 below.

TABLE 2

| | Types |
| --- | --- |
| Physical channels | Physical Sidelink Broadcast Channel (PSBCH) |
| | Physical Sidelink Shared Channel (PSSCH) |
| | Physical Sidelink Control Channel (PSCCH) |
| | Physical Sidelink Discovery Channel (PSDCH) |
| Physical signals | Demodulation-Reference Signal (DM-RS) |
| | Primary Sidelink Synchronization Signal (PSSS) |
| | Secondary Sidelink Synchronization Signal (SSSS) |

The physical channels for the sidelink communication may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE by a higher layer signaling. The PSCCH may be used for transmitting and receiving sidelink control information (SCI) and may also be configured in the UE by a higher layer signaling.

The PSDCH can be used for the discovery procedure. For example, the UE may transmit a discovery signal through the PSDCH to search for another UE. The discovery procedure may be performed in the sidelink communication scenarios A to D defined in Table 1. The PSBCH may be used for transmitting and receiving broadcast information (e.g., system information). The system information may include information indicating a frame number (e.g., a system frame number (SFN)), information indicating a system bandwidth, uplink-downlink (UL-DL) subframe configuration information, and the like.

Also, the DM-RS, the synchronization signal, and the like may be used in the sidelink communication. The DM-RS may be used for channel estimation in the sidelink communication. The synchronization signal may be used for link synchronization in the sidelink communication, and may include the PSSS and the SSSS.

Meanwhile, a sidelink transmission mode (TM) may be classified into sidelink TMs 1 to 4 as shown below in Table 3.

TABLE 3

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, the UE may perform sidelink communications using a resource pool configured by the base station. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE within the resource pool configured by the dedicated RRC signaling procedure or the broadcast RRC signaling procedure.

Meanwhile, resources for sidelink communication in the communication system (e.g., LTE communication system) may be configured as follows.

Figure 4:
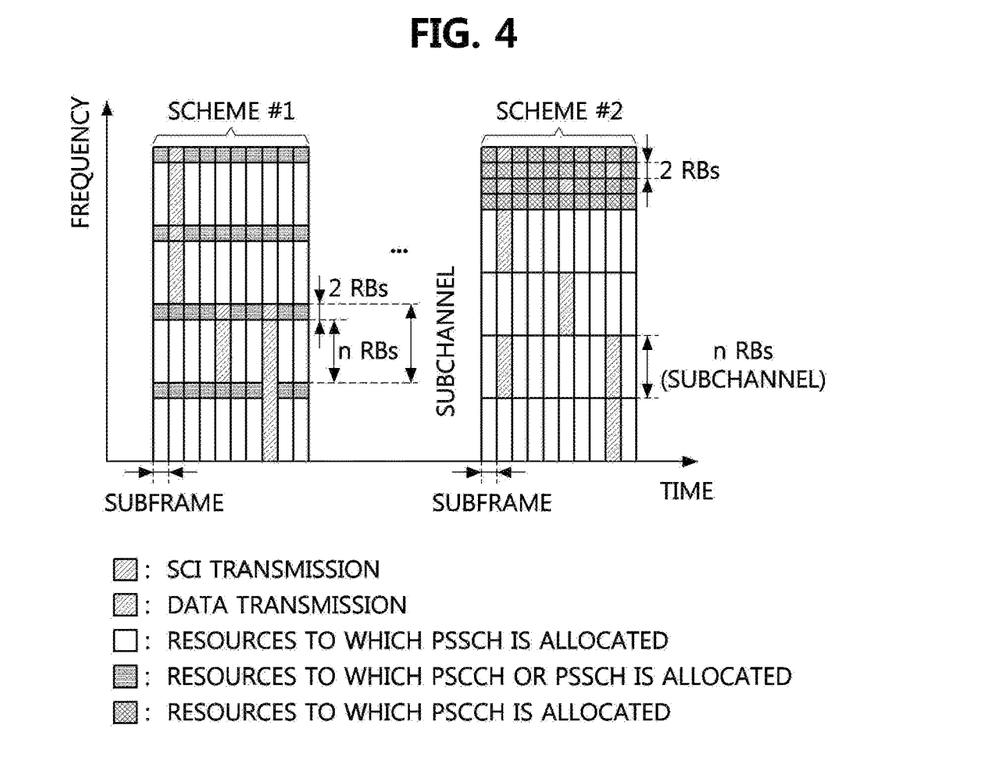
FIG. 4 is a conceptual diagram illustrating a first embodiment of resources for sidelink communication in a communication system.

FIG. 4 is a conceptual diagram illustrating a first embodiment of resources for sidelink communication in a communication system.

As shown in FIG. 4, a resource pool for sidelink communication may be configured, and the UE may perform a sensing operation (e.g., listen-before-talk (LBT) operation, clear channel assessment (CCA)) operation, etc.) on a subchannel basis within the resource pool. Sidelink traffic (e.g., sidelink control information and sidelink data) may be transmitted through a subchannel determined to be in an idle state by the sensing operation.

A subchannel may include one or more subframes in the time domain and one or more resource blocks (RBs) in the frequency domain. The same subframe may include a PSCCH and a PSSCH associated with the corresponding PSCCH. The PSCCH and the PSSCH may be allocated to adjacent RBs. For example, in the communication scenario in which a scheme #1 shown in FIG. 4 is applied, the RBs to which the PSCCH is allocated may be adjacent to the RBs to which the PSSCH is allocated. Alternatively, the PSCCH and the PSSCH may be allocated to non-adjacent RBs. For example, in the communication scenario in which a scheme #2 shown in FIG. 4 is applied, the RBs to which the PSCCH is allocated may be non-adjacent to the RBs to which the PSSCH is allocated. The number of RBs belonging to the subchannel may be configured differently for each of the PSCCH/PSSCH allocation schemes (i.e., schemes #1 and #2 shown in FIG. 4).

Next, methods for sidelink communication in the NR communication system supporting various numerologies will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., first vehicle) is described, a corresponding UE #2 (e.g., second vehicle) may perform an operation corresponding to the operation of the UE #1. Conversely, when an operation of the UE #2 (e.g., second vehicle) is described, the corresponding UE #1 (e.g., first vehicle) may perform an operation corresponding to the operation of the UE #2. In the embodiments described below, the operation of the vehicle may be the operation of the communication node located in the vehicle.

The communication system may support communication in various frequency bands. In particular, the communication system may support multi-beam operation for efficient data transmission in the high frequency band. In order to overcome a severe path loss in the high frequency band, a beamforming-based communication scheme supporting multi-beam operation may be necessary. Also, in order to provide various communication services, the communication system may support various numerologies as shown in Table 4 below. That is, the numerology applied to the physical channels and the physical signals in the communication system may be varied.

TABLE 4

| Parameter/numerology ($\mu$) | 0 | 1 | 2 | 3 | 4 |
|---|---|---|---|---|---|
| Subcarrier spacing (kHz) | 15 | 30 | 60 | 120 | 240 |
| OFDM symbol duration ($\mu$s) | 66.67 | 33.33 | 16.67 | 8.33 | 4.17 |
| Cyclic prefix (CP) duration ($\mu$s) | 4.69 | 2.34 | 1.17 | 0.57 | 0.29 |
| OFDM symbol duration ($\mu$s) including CP | 71.35 | 35.68 | 17.84 | 8.92 | 4.46 |

The numerology may be referred to as $\mu$, and $\mu$ may be set to 0, 1, 2, 3, or 4. $\mu$ may be configured to the UE by RRC signaling. For example, the base station may transmit an RRC message including $\mu$ to the UE. In the frequency band of 6 GHz or less (hereinafter referred to as 'FR1'), the usable numerology $\mu$ may be 0 or 1. In the frequency band of 6 GHz or more (hereinafter referred to as 'FR2'), the usable numerology $\mu$ may be 2 or 3. Meanwhile, resources according to the numerology may be configured as follows.

Figure 5:
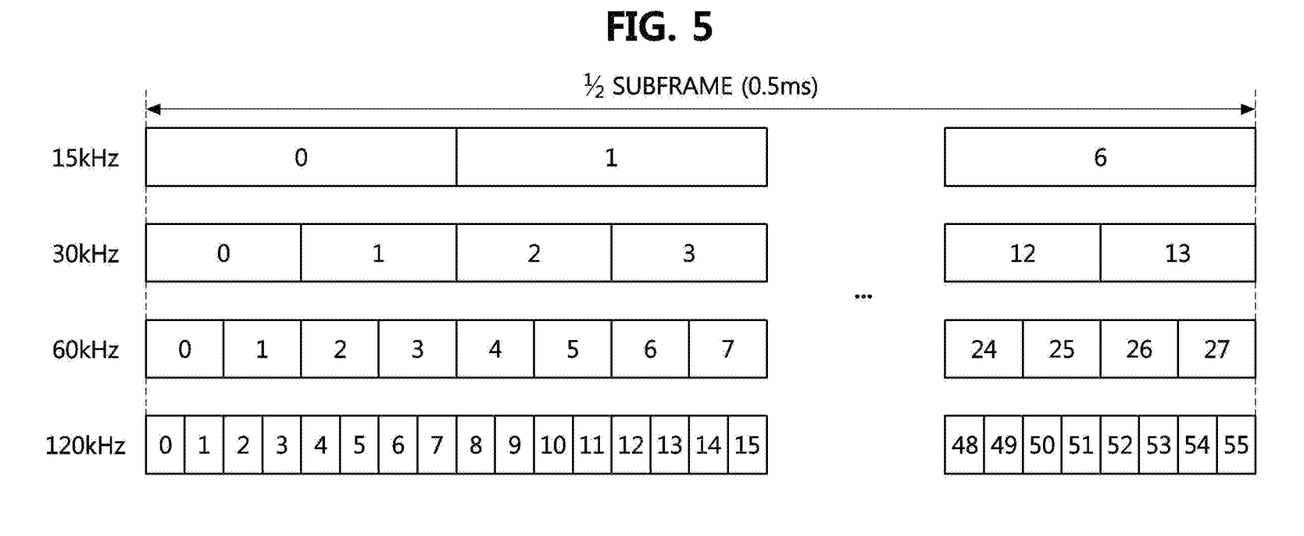
FIG. 5 is a conceptual diagram illustrating a first embodiment of resources according to a numerology in a communication system.

FIG. 5 is a conceptual diagram illustrating a first embodiment of resources according to a numerology in a communication system.

As shown in FIG. 5, one radio frame may include 10 subframes, the length of one subframe may be 1 ms, and the length of a ½ subframe may be 0.5 ms. One slot may comprise 14 OFDM symbols. Here, one RB may include 12 subcarriers.

When $\mu$ is 0 (i.e., the subcarrier spacing is 15 kHz), the length of one slot may be 1 ms and the size of one RB in the frequency domain may be 180 kHz. When $\mu$ is 1 (i.e., the subcarrier spacing is 30 kHz), the length of one slot may be 0.5 ms and the size of one RB in the frequency domain may be 360 kHz. When $\mu$ is 2 (i.e., the subcarrier spacing is 60 kHz), the length of one slot may be 0.25 ms and the size of one RB in the frequency domain may be 720 kHz. When $\mu$ is 3 (i.e., the subcarrier spacing is 120 kHz), the length of one slot may be 0.125 ms and the size of one RB in the frequency domain may be 1440 kHz. When $\mu$ is 4 (i.e., the subcarrier spacing is 240 kHz), the length of one slot may be 0.0625 ms and the size of one RB in the frequency domain may be 2880 kHz.

In the sidelink communication, the sensing operation for radio resources may be performed on a subchannel basis. The sensing operation may be performed to search for radio resources to be used for the sidelink communication. The subchannel may be composed of one or more RBs in the frequency domain, and the size of the subchannel may vary in the frequency domain as the numerology varies. For example, when the subchannel is composed of one RB and the numerology $\mu$ is 0, the size of the subchannel may be 180 kHz in the frequency domain. When the subchannel is composed of one RB and the numerology $\mu$ is 1, the size of the subchannel may be 360 kHz in the frequency domain. Accordingly, the size of the subchannel on which the UE performs the sensing operation may vary as the numerology varies. In this case, the implementation complexity of the UE may increase, and the sidelink communication may not be efficiently performed. In order to solve this problem, a common subchannel having the same size may be defined regardless of the numerology.

Since the numerologies 0 and 1 may be used in FR1 and the numerologies 2 and 3 may be used in FR2, the minimum number $N_{min}^{subchannel,\mu}$ of RBs constituting a subchannel (i.e., a common subchannel) may be configured for each of (numerologies 0 and 1) or (numerologies 2 and 3). For example, the minimum number $N_{min}^{subchannel,\mu}$ of RBs constituting a subchannel (i.e., a common subchannel) may be configured based on Equation 1 below.

$$M_{min}^{subchannel,\mu} = \begin{cases} K \cdot 2 \cdot 2^{-\mu}, \mu = 0, 1 \\ K \cdot 2 \cdot 2^{-(\mu-2)}, \mu = 2, 3 \end{cases} \quad \text{[Equation 1]}$$

K may be configured by the base station, and the base station may transmit system information, an RRC message, a MAC control element (CE), or downlink control information (DCI) including K to the UE. The UE may identify K by receiving the system information, RRC message, MAC CE, or DCI from the base station. Here, K may be a natural number. Alternatively, K may be predefined in the 3GPP specification, and the base station and the UE may use K predefined in the 3GPP specification.

For example, when K is 1 and the numerology $\mu$ is 0, $N_{min}^{subchannel,\mu}$ may be 2. In this case, the size of the subchannel in the frequency domain may be 360 kHz (=15 kHz×2 (number of RBs)×12 (number of subcarriers per RB)). When K is 1 and the numerology $\mu$ is 1, $N_{min}^{subchannel,\mu}$ may be 1. In this case, the size of the subchannel in the frequency domain may be 360 kHz (=30 kHz×1 (number of RBs)×12 (number of subcarriers per RB)). That is, the size of the subchannel in the frequency domain when the numerology $\mu$ 0 is used may be the same as the size of the subchannel in the frequency domain when the numerology $\mu$1 is used. Therefore, the UE may perform the sensing operation for the subchannel having the same size in FR1.

When K is 1 and the numerology $\mu$ is 2, $N_{min}^{subchannel,\mu}$ may be 2. In this case, the size of the subchannel in the frequency domain may be 1440 kHz (=60 kHz×2 (number of RBs)×12 (number of subcarriers per RB)). When K is 1 and the numerology $\mu$ is 3, $N_{min}^{subchannel,\mu}$ may be 1. In this case, the size of the subchannel in the frequency domain may be 1440 kHz (=120 kHz×1 (number of RBs)×12 (number of subcarriers per RB)). That is, the size of the subchannel in the frequency domain when the numerology $\mu$ 2 is used may be the same as the size of the subchannel in the frequency domain when the numerology 3 is used. Therefore, the UE may perform the sensing operation for the subchannel having the same size in FR2.

Also, the size $N_{PSCCH}^{subchannel,\mu}$ of the subchannel through which a PSCCH including SCI (e.g., SCI including scheduling information) is transmitted and the size $N_{PSCCH}^{subchannel,\mu}$ of the subchannel through which a PSSCH scheduled by the SCI is transmitted may be configured based on $N_{min}^{subchannel,\mu}$. That is, $N_{PSSCH}^{subchannel,\mu}$ and $N_{PSSCH}^{subchannel,\mu}$ may be defined based on Equation 2 below.

$$N_{PSSCH}^{subchannel,\mu} = n_1 \cdot N_{min}^{subchannel,\mu}, \mu=0,1,2,3$$

$$N_{PSSCH}^{subchannel,\mu} = n_2 \cdot N_{min}^{subchannel,\mu}, \mu=0,1,2,3 \quad \text{[Equation 2]}$$

Here, $n_1$ and $n_2$ may be configured by the base station, and the base station may transmit system information, an RRC message, a MAC CE, or a DCI including $n_1$ and $n_2$ to the UE. The UE may identify $n_1$ and $n_2$ by receiving the system information, the RRC message, the MAC CE, or the DCI from the base station. Here, each of $n_1$ and $n_2$ may be a natural number. Alternatively, $n_1$ and $n_2$ may be predefined in the 3GPP specification, and the base station and the UE may use $n_1$ and $n_2$ predefined in the 3GPP specification.

Meanwhile, the sidelink communication may be performed using multiple beams, and the multi-beam based sidelink communication may be performed as follows.

Figure 6:
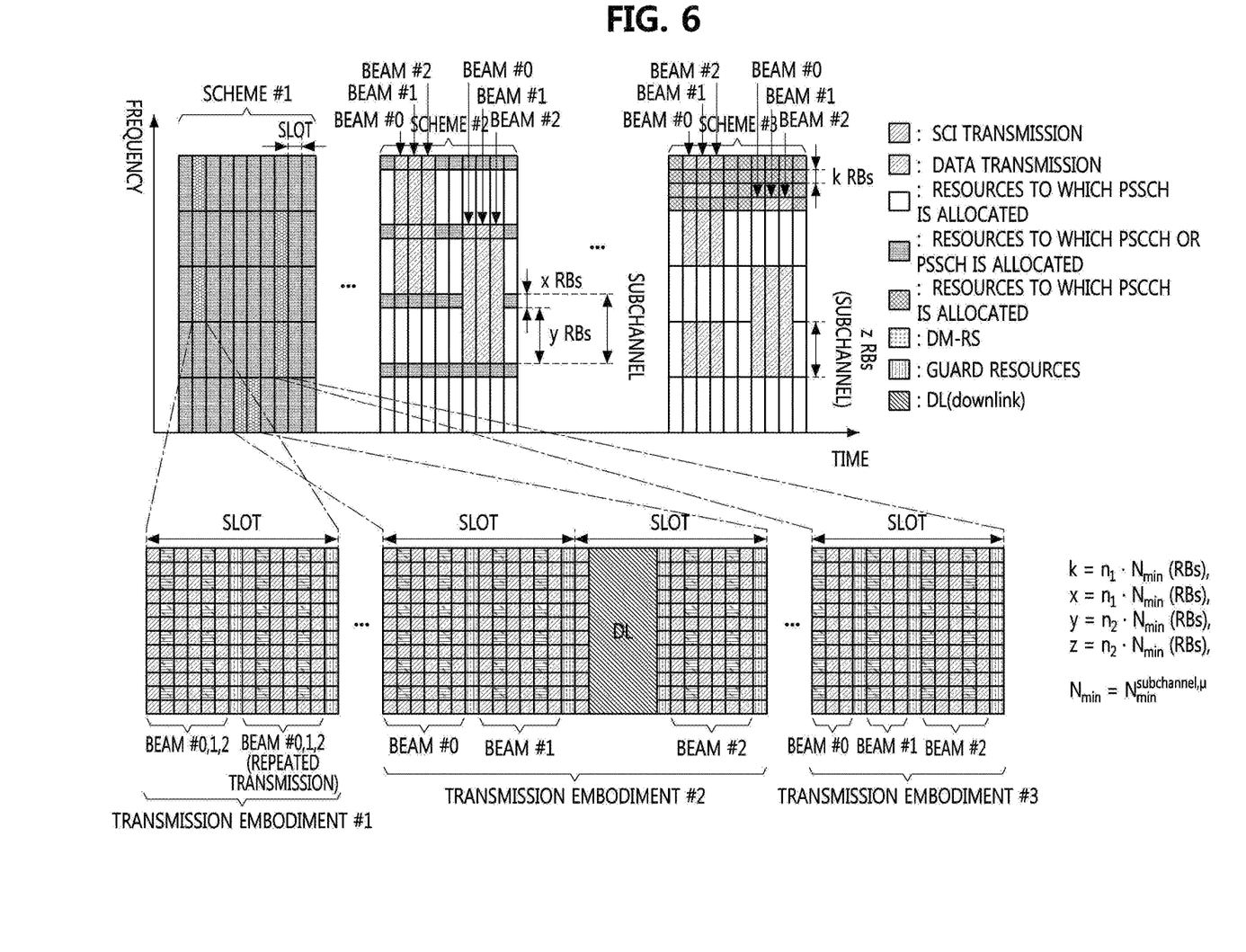
FIG. 6 is a conceptual diagram illustrating a first embodiment of a multi-beam-based sidelink communication method in a communication system.

FIG. 6 is a conceptual diagram illustrating a first embodiment of a multi-beam-based sidelink communication method in a communication system.

As shown in FIG. 6, a subchannel for sidelink communication may be configured, and the sidelink communication may be performed on a subchannel basis. The subchannel may include one or more slots (or one or more subframes) in the time domain, and may include one or more RBs in the frequency domain. The minimum number of RBs constituting the subchannel may be configured based on $N_{min}^{subchannel,\mu}$ defined in Equation 1. The size of the subchannel through which the PSCCH is transmitted may be configured based on $N_{PSCCH}^{subchannel,\mu}$ defined in Equation 2, and the size of the subchannel through which the PSSCH is transmitted may be configured based on $N_{PSSCH}^{subchannel,\mu}$ defined in Equation 2. Here, the size of the subchannel may be the size of frequency resources.

The structure of the resource pool may vary according to schemes #1, #2, and #3 shown in FIG. 6. In a communication scenario to which the scheme #1 shown in FIG. 6 is applied, all resources belonging to the resource pool may be used for PSCCH or PSSCH. In a communication scenario to which the scheme #2 shown in FIG. 6 is applied, resources belonging to the resource pool may include a set of resources used for PSCCH or PSSCH and a set of resources used only for PSSCH. In a communication scenario to which the scheme #3 shown in FIG. 6 is applied, resources belonging to the resource pool may include a set of resources used only for PSCCH and a set of resources used only for PSSCH.

The same slot may include a PSCCH and a PSSCH associated with the corresponding PSCCH. The PSCCH and the PSSCH may be allocated to adjacent RBs. For example, in the communication scenario to which the scheme #2 shown in FIG. 6 is applied, the RBs to which the PSCCH is allocated may be adjacent to the RBs to which the PSSCH is allocated. Alternatively, the PSCCH and the PSSCH may be allocated to non-adjacent RBs. For example, in the communication scenario to which the scheme #3 shown in FIG. 6 is applied, the RBs to which the PSCCH is allocated may not be adjacent to the RBs to which the PSSCH is allocated.

The UE may repeatedly transmit the same data (e.g., sidelink data) in slots (or subframes). The UE may transmit the same data using different beams in the respective slots. For example, the UE may transmit data using a beam #0 in a slot #0 and may transmit the data using a beam #1 in a slot #1. In this case, a transmission diversity effect may be achieved. Such the beam switching may be performed between adjacent slots. Alternatively, the beam switching may be performed between non-contiguous slots.

The UE may determine the resources used for the multi-beam based sidelink communication by performing sensing operations on the resources belonging to the resource pool. Resources may be reserved on a subchannel basis. When the same data is transmitted using many beams, a large number of resources may be used for the transmission of the same data. In this case, resource utilization efficiency may be lowered. To solve this problem, the maximum number $N_{max,beam}$ of beams usable for sidelink communication may be configured. For example, the base station may set $N_{max,beam}$, and may transmit system information, an RRC message, a MAC CE, or a DCI, including information indicating $N_{max,beam}$, to the UE.

Also, the UE may determine the number of beams to be used according to the type of sidelink traffic among $N_{max,beam}$ beams. The number of beams used for transmission of broadcast traffic may be set to be greater than the number of beams used for transmission of unicast traffic. For example, the UE may transmit broadcast traffic using $N_{max,beam}$ beams, and may transmit unicast traffic using one beam.

On the other hand, when the beam switching is performed in a slot unit (or a subframe unit), a plurality of slots (or a plurality of subframes) may be required to repeatedly transmit the same data. In this case, a transmission latency may occur. For V2X traffic requiring low latency transmission, the same V2X traffic may be repeatedly transmitted using a plurality of beams in one slot (or one subframe). That is, the unit of performing the beam switching may be smaller than a slot unit (or a subframe unit).

That is, in the communication scenario to which the scheme #1 shown in FIG. 6 is applied, the UE may repeatedly transmit the same data using a plurality of beams (e.g., two or three beams) in one slot. In a transmission embodiment #1, the UE may repeatedly transmit the same data using a plurality of beams (e.g., beams #0, #1, and #2) at the same time. Guard resources may be configured between the resources used for the initial transmission and the resources used for the repeated transmission.

In a transmission embodiment #2 or #3, the UE may repeatedly transmit the same data using a plurality of beams according to a beam sweeping scheme in one slot (or one subframe). In the transmission embodiment #2, downlink (DL) communication and sidelink communication may be performed in one slot. Guard resources may be configured for the beam switching. For example, guard resources may be configured between resources configured for the beam #0 and resources configured for the beam #1, and guard resource may be configured between the resources configured for the beam #1 and resources configured for the beam #2. In addition, guard resources may be configured for changing a communication mode. For example, guard resources may be configured between resources used for downlink communication and resources used for sidelink communication.

In the communication scenario to which the scheme #1 shown in FIG. 6 is applied, the PSCCH and the PSSCH may be allocated to a common subchannel. Also, in order to reduce the data reception latency time, the PSCCH may be located before the PSSCH in the time domain. In this case, the PSCCH may be demodulated before the reception of the PSSCH. In the communication scenario to which the scheme #2 or the scheme #3 shown in FIG. 6 is applied, the UE may perform sidelink communication based on the transmission embodiments #1 to #3.

Meanwhile, the sidelink communication based on the embodiments described with reference to FIGS. 4 to 6 may be performed as follows.

Figure 7:
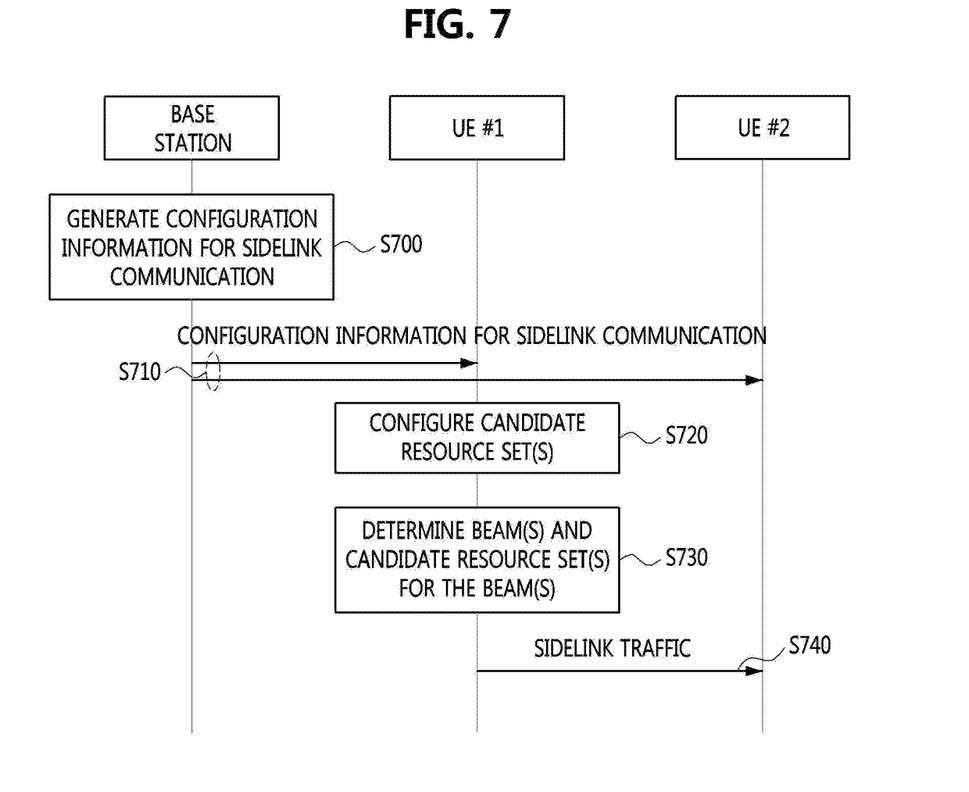
FIG. 7 is a sequence chart illustrating a first embodiment of a sidelink communication method in a communication system.

FIG. 7 is a sequence chart illustrating a first embodiment of a sidelink communication method in a communication system.

Referring to FIG. 7, a communication system may include a base station, a UE #1, a UE #2, and the like. The base station may be the base station 210 shown in FIG. 2, the UE #1 may be the UE #5 235 shown in FIG. 2, and the UE #2 may be the UE #6 236 shown in FIG. 2. Each of the base station, the UE #1, and the UE #2 may be configured similarly to the communication node 300 shown in FIG. 3.

The base station may generate configuration information for sidelink communication (S700). The configuration information for the sidelink communication may include one or more of information elements described in Table 5 below.

TABLE 5

| Information Elements | Description |
| --- | --- |
| Information Element #1 | Indicates configuration information of a subchannel |
| Information Element #2 | Indicates the maximum number $N_{max,\ beam}$ of beams that can be used for sidelink communication |
| Information Element #3 | Indicates the scheme #1, #2, or #3 shown in FIG. 6 |

The configuration information of the subchannel may include one or more of $N_{min}^{subchannel,\mu}$ determined based on Equation 1, K used for determining $N_{min}^{subchannel,\mu}$, $n_1$ used for determining $N_{PSCCH}^{subchannel,\mu}$, and $n_2$ used for determining $N_{PSSCH}^{subchannel,\mu}$. The base station may transmit the configuration information for the sidelink communication to the UE #1 and the UE #2 through at least one of system information, an RRC message, a MAC CE, and a DCI (S710). For example, the information elements included in the configuration information for the sidelink communication may be transmitted through the system information, the RRC message, the MAC CE, or the DCI. Alternatively, the information elements included in the configuration information for the sidelink communication may be transmitted in different manners. For example, the information element #1 may be transmitted through an RRC message, and the information elements #2 and #3 may be transmitted through a DCI.

The UEs #1 and #2 may obtain the configuration information (e.g., the information elements #1 to #3) for the sidelink communication by receiving at least one of the system information, the RRC message, the MAC CE and the DCI from the base station. Alternatively, the configuration information for the sidelink communication may be predefined in the 3GPP specification, and the base station, the UE #1, and the UE #2 may use the configuration information for the sidelink communication defined in the 3GPP specification.

When the sidelink traffic occurs in the UE #1, the UE #1 may configure a candidate resource set(s) by performing a sensing operation on the resource pool using the configuration information for the sidelink communication (S720). For example, the UE #1 may determine that the resource pool is configured according to a scheme indicated by the information element #3. The UE #1 may identify the size of a subchannel, which is the minimum unit constituting the candidate resource set, based on the information indicated by the information element #1, and may perform a sensing operation on a subchannel basis. Here, the minimum number of RBs constituting the subchannel may be configured according to Equation 1. The size of the subchannel through which the PSCCH is transmitted may be configured based on $N_{PSCCH}^{subchannel,\mu}$ defined in Equation 2, and the size of the subchannel through which the PSSCH is transmitted may be configured based on $N_{PSSCH}^{subchannel,\mu}$ defined in Equation 2.

The UE #1 may configure resources determined to be in an idle state by the sensing operation as the candidate resource set. The number of candidate resource set(s) configured by the UE #1 may be less than or equal to the number indicated by the information element #2 (i.e., the maximum number of usable beams). In addition, the step S720 may also be performed by the UE #2 in which no sidelink traffic occurs.

The UE #1 may determine beam(s) to be used for transmission of the sidelink traffic and candidate resource set(s) for the corresponding beam(s) (S730). The UE #1 may transmit the sidelink traffic using the corresponding beam(s) in the candidate resource set(s) (S740). For example, if the beams to be used for transmission of the sidelink traffic are beams #0 and #1, and a candidate resource set #0 for the beam #0 does not overlap a candidate resource set #1 for the beam #1, the UE #1 may transmit the sidelink traffic using the beam #0 in the candidate resource set #0, and may transmit the sidelink traffic using the beam #1 in the candidate resource set #1. That is, the sidelink traffic may be transmitted in a beam sweeping manner.

Alternatively, if the beams to be used for transmission of the sidelink traffic are beams #0 and #1, and the candidate resource set #0 for the beam #0 overlaps the candidate resource set #1 for the beam #1, the UE #1 may transmit the same sidelink traffic using a plurality of beams (i.e., beam #0 and beam #1) in the overlapped candidate resource set. That is, the sidelink traffic may be transmitted simultaneously using multiple beams.

The UE #2 may receive the sidelink traffic from the UE #1 by performing a sensing operation on the resource pool. The sensing operation on the resource pool may be performed in units of a subchannel indicated by the configuration information for the sidelink communication.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A sidelink communication method performed by a user equipment (UE) in a communication system, the sidelink communication method comprising:
   receiving, from a base station, a message including configuration information of a subchannel which is a sensing unit of a resource pool;
   determining a size of the subchannel based on the configuration information; and
   performing a sensing operation in units of the subchannel in the resource pool,
   wherein the subchannel includes one or more resource blocks (RBs), the size of the subchannel is configured to be identical regardless of a numerology $\mu$, the subchannel is a resource unit in a frequency domain, the size of the subchannel in case that the numerology $\mu$ is configured as a first value is identical to the size of the subchannel in case that the numerology $\mu$ is configured as a second value which is different from the first value, and a number of RBs included in the subchannel with first value is different from a number of RBs included in the subchannel with the second value.

2. The sidelink communication method according to claim 1, wherein the configuration information is received through at least one of system information, a radio resource control (RRC) message, a medium access control (MAC) control element (CE), and downlink control information (DCI).

3. The sidelink communication method according to claim 1, wherein a minimum number of RBs constituting the subchannel is determined by $K \times 2 \times 2^{-\mu}$ when the numerology $\mu$ is 0 or 1, and determined by $K \times 2 \times 2^{-(\mu-2)}$ when the numerology $\mu$ is 2 or 3, and K is included in the configuration information of the subchannel and is a natural number.

4. The sidelink communication method according to claim 3, wherein the size of the subchannel through which a physical sidelink control channel (PSCCH) is transmitted is determined by $n_1 \times$(the minimum number of RBs), and $n_1$ is included in the configuration information of the subchannel and is a natural number.

5. The sidelink communication method according to claim 3, wherein the size of the subchannel through which a physical sidelink shared channel (PSSCH) is transmitted is determined by $n_2 \times$(the minimum number of RBs), number of and $n_2$ is included in the configuration information of the subchannel and is a natural number.

6. The sidelink communication method according to claim 1, wherein the message further includes information indicating a maximum number of usable beams.

7. The sidelink communication method according to claim 6, further comprising transmitting sidelink traffic using beam(s) equal to or less than the maximum number of usable beams in a candidate resource set(s) comprised of resources determined to be in an idle state by the sensing operation, and the sidelink traffic includes at least one of sidelink control information and sidelink data.

8. The sidelink communication method according to claim 7, wherein the sidelink traffic is transmitted using a plurality of beams in a slot belonging to the candidate resource set(s).

9. The sidelink communication method according to claim 7, wherein the sidelink traffic is transmitted using a different beam in each of a plurality of slots belonging to the candidate resource set(s).

10. The sidelink communication method according to claim 1, wherein the message further includes information indicating a structure of the resource pool, all resources belonging to the resource pool having a first structure are used for transmission of a PSCCH or a PSSCH, resources used for transmission of the PSSCH are configured to be adjacent to resources used for transmission of the PSCCH in the resource pool having a second structure, and resources used for transmission of the PSSCH are configured to be non-adjacent to resources used for transmission of the PSCCH in the resource pool having a third structure.

11. An operation method of a base station supporting sidelink communication in a communication system, the operation method comprising:

generating a message including configuration information of a subchannel which is a sensing unit of a resource pool; and transmitting, to a user equipment (UE), the message through at least one of system information, a radio resource control (RRC) message, a medium access control (MAC) control element (CE), and downlink control information (DCI), wherein the subchannel includes one or more resource blocks (RBs), a size of the subchannel is configured to be identical regardless of a numerology μ, the subchannel is a resource unit in a frequency domain, the size of the subchannel in case that the numerology μ is configured as a first value is identical to the size of the subchannel in case that the numerology μ is configured as a second value which is different from the first value, and a number of RBs included in the subchannel with the first value is different from a number of RBs included in the subchannel with the second value.

12. The operation method according to claim 11, wherein the message further includes information indicating a maximum number of usable beams and information indicating a structure of the resource pool, all resources belonging to the resource pool having a first structure are used for transmission of a physical sidelink control channel (PSCCH) or a physical sidelink shared channel (PSSCH), resources used for transmission of the PSSCH are configured to be adjacent to resources used for transmission of the PSCCH in the resource pool having a second structure, and resources used for transmission of the PSSCH are configured to be non-adjacent to resources used for transmission of the PSCCH in the resource pool having a third structure.

13. The operation method according to claim 11, wherein a minimum number of RBs constituting the subchannel is determined by $K \times 2 \times 2^{-\mu}$ when the numerology μ is 0 or 1, and determined by $K \times 2 \times 2^{-(\mu-2)}$ when the numerology μ is 2 or 3, and K is included in the configuration information of the subchannel and is a natural number.

14. The operation method according to claim 13, wherein the size of the subchannel through which a physical sidelink control channel (PSCCH) is transmitted is determined by $n_1 \times$(the minimum number of RBs), and $n_1$ is included in the configuration information of the subchannel and is a natural number.

15. The operation method according to claim 13, wherein the size of the subchannel through which a physical sidelink shared channel (PSSCH) is transmitted is determined by $n_2 \times$(the minimum number of RBs), and $n_2$ is included in the configuration information of the subchannel and is a natural number.

16. A user equipment (UE) performing sidelink communication in a communication system, the UE comprising a processor, a transceiver transmitting and receiving signals according to control of the processor, and a memory storing at least one instruction executable by the processor, wherein the at least one instruction configures the processor to:

receive, from a base station, a message including configuration information of a subchannel which is a sensing unit of a resource pool;

determine a size of the subchannel based on the configuration information; and perform a sensing operation in units of the subchannel in the resource pool, wherein the subchannel includes one or more resource blocks (RBs) the size of the subchannel is configured to be identical regardless of a numerology μ, the subchannel is a resource unit in a frequency domain, the size of the subchannel in case that the numerology μ is configured as a first value is identical to the size of the subchannel in case that the numerology μ is configured as a second value which is different from the first value, and a number of RBs included in the subchannel with the first value is different from a number of RBs included in the subchannel with the second value.

17. The UE according to claim 16, wherein a minimum number of RBs constituting the subchannel is determined by $K \times 2 \times 2^{-\mu}$ when the numerology μ is 0 or 1, and determined by $K \times 2 \times 2^{-(\mu-2)}$ when the numerology μ is 2 or 3, and K is included in the configuration information of the subchannel and is a natural number.

18. The UE according to claim 16, wherein the message further includes information indicating a maximum number of usable beams.

19. The UE according to claim 18, wherein the at least one instruction further configures the processor to transmit sidelink traffic using beam(s) equal to or less than the maximum number of usable beams in a candidate resource set(s) comprised of resources determined to be in an idle state by the sensing operation.

20. The UE according to claim 18, wherein the message further includes information indicating a structure of the resource pool, all resources belonging to the resource pool having a first structure are used for transmission of a PSCCH or a PSSCH, resources used for transmission of the PSSCH are configured to be adjacent to resources used for transmission of the PSCCH in the resource pool having a second structure, and resources used for transmission of the PSSCH are configured to be non-adjacent to resources used for transmission of the PSCCH in the resource pool having a third structure.

* * * * *